April 26, 1938.     H. H. DECKER     2,115,520
SPECIFIC GRAVITY MEASURING DEVICE
Filed Feb. 6, 1937

WITNESS:
Rob W. Kitchel

INVENTOR
Howard H. Decker
BY
Augustus B. Stoughton
ATTORNEY.

Patented Apr. 26, 1938

2,115,520

UNITED STATES PATENT OFFICE 2,115,520

SPECIFIC GRAVITY MEASURING DEVICE

Howard H. Decker, Fairview, N. J.

Application February 6, 1937, Serial No. 124,473

4 Claims. (Cl. 265—44)

The principal object of the present invention is to provide a comparatively simpler, accurate and reliable instrument for determining the specific gravity or density, especially of flowing liquids and for continuously indicating or recording the same.

Another object of the invention is to adapt the instrument for use with corrosive or dirty liquid and with liquids adapted to deposit crystals.

Another object of the invention is to provide constant information of the density of any solution in cases where chemical processes are used, to the end that more uniform products may be obtained.

To these and other ends hereinafter set forth or appearing the invention generally stated comprises interconnected devices adapted to convert hydrostatic pressure into motion and respectively in communication with vertically spaced fixed points submerged in a constant level liquid. The interconnected movable elements of said devices are of weight adapted to balance the difference in hydrostatic pressure at said points when the specific gravity of the liquid has a certain value, and are adapted to move upon departure from that value. An indicator or recorder operatively connected with said movable elements is provided. Also the structure may be constructed with or without seal means adapted to protect the devices from the corrosive or other deleterious action of the liquid.

The invention also comprises the improvements to be presently described and finally claimed.

In the following description reference will be made to the accompanying drawing forming part hereof and in which, Figure 1 is a diagrammatic central section of a specific gravity measuring device embodying features of the invention.

Figure 2:
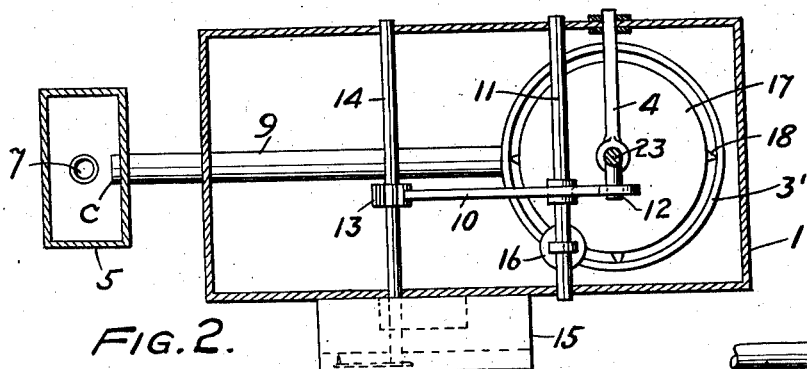
Figure 2 is a sectional plan view taken on the line 2—2 of Figure 1.
Figure 1:
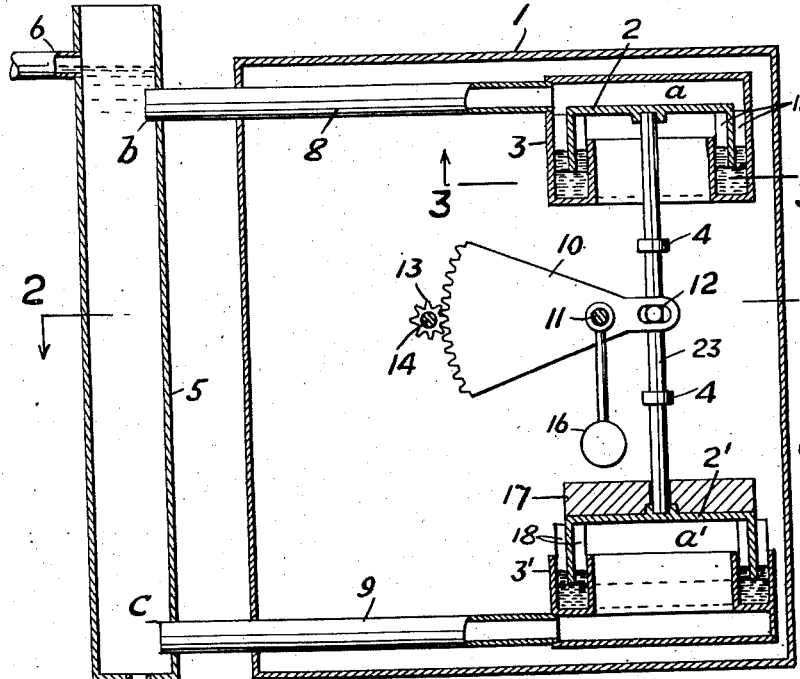
Figure 3:
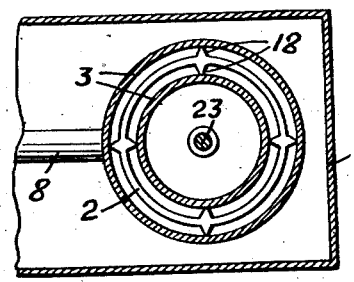
Figure 3 is a sectional view taken on the line 3—3 of Figure 1 looking upward.

In the drawing, 1 is a frame or housing shown as generally rectangular. There are interconnected devices adapted to convert fluid pressure into motion. As shown they comprise mercury dipped seals having bells 2 and 2' and seal pots 3 and 3'. The bells 2 and 2' are interconnected by a rod 23 movable in guides 4. The space "a" outside of the bell 2 and the space "a'" inside of the bell 2' are respectively in communication with vertically spaced fixed points "b" and "c" submerged in a constant level liquid flowing through the conduit 5 open at the top and provided with an outflow connection 6 above the point "b" and with an inlet connection 7. The pipe connections 8 and 9 connect the spaces "a" and "a'" with the flowing liquid in the conduit 5 at the points "b" and "c" respectively. 10 is a toothed arm pivotally supported by means of the shaft 11 carried by the frame or housing 1. At one of its ends this arm 10 is connected by a slot and pin connection 12 with the rod 23, and at its other ends it meshes with a pinion 13. The pinion 13 is fast on a shaft 14 turnably mounted in the frame or housing 1 and as shown it drives a recorder or indicator 15. A recorder is indicated on the drawing but it may be operated as an indicator. The weighted arm 16 attached to the shaft 11 operates to oppose hunting of the recorder or indicator.

The mode of operation of the instrument may be described as follows: There is between the points "b" and "c" a difference in pressure and the weight of the movable elements of the mercury seals, including the bells and rod 3, is such that it balances the difference in pressure between the points "b" and "c" when the density or specific gravity of the liquid has a predetermined value and at other values the difference in pressure between the points "b" and "c" is no longer balanced by the weight of the interconnected bells so that the latter and the parts which they actuate move, and this movement is reflected at the indicator or recorder 15 so that in the case of a recorder there is provided a constant record of the specific gravity or density of the fluid flowing through the conduit. Various expedients may be resorted to to balance the interconnected bells against the difference in pressure between the points "b" and "c" when that difference has a predetermined value corresponding to the normal density or specific gravity of the liquid. Among them reference may be made to a difference in the effective areas of the bells and to the use of a weight as 17.

It may be remarked that 18 indicates fins on the bells which serve to center them.

In stating that liquid in the conduit 5 is at constant level the meaning is that the level shall remain substantially constant after the instrument has been adjusted and while it is in use. Of course the level of the liquid may occupy different positions to which the instrument has been adjusted.

Figures 4, 5:
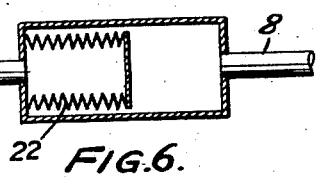
Figures 4, 5, and 6 are sectional views illustrating modifications.
Figure 6:
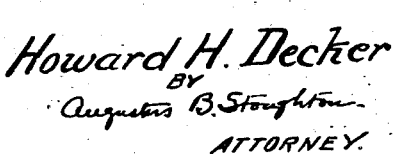

In some instances the liquid is corrosive, dirty or apt to deposit crystals. It is, therefore, desirable that such liquid should not contact with the mercury or enter the spaces "a" and "a'". To that end I may interpose in the pipe connection 8 a seal 19 containing for example oil 20 or I may introduce a diaphragm 21, Fig. 5, or a sylphon or other bellows 22, Fig. 6.

The mercury seals 3 and 3' may also be replaced by a pair of interconnected diaphragms or by a pair of interconnected sylphon bellows. It is believed to be unnecessary to illustrate these since those skilled in the art will readily understand their construction and mode of operation without further illustration or description.

It will be obvious to those skilled in the art to which the invention relates that modifications may be made in details of construction and arrangement without departing from the spirit of the invention which is not limited in respect to such matters or otherwise than as the prior art and the appended claims may require.

I claim:

1. A specific gravity measuring device comprising interconnected devices adapted to convert fluid pressure into motion and respectively in communication with vertically spaced points submerged at a fixed distance in a liquid, the interconnected movable elements of said devices being of weight adapted to balance the difference in pressure at said points when the specific gravity of the liquid has a certain value and to move upon departure from that value, a single rod connected to each of said devices and forming the interconnection between them, and an indicator operatively connected with said interconnected movable elements.

2. A specific gravity measuring device comprising dipped seals having their dip pots connected respectively to vertically spaced points submerged in the liquid to be measured, the bells of the dip seals being interconnected reversely disposed and balanced against the difference in hydrostatic pressure at said points when the density of the liquid is of predetermined value and adapted to be unbalanced and to move when the density of the liquid varies from that value, a single rod connected to each of said bells and serving to interconnect them, and a gauge connected with the interconnected bells.

3. A specific gravity measuring device comprising a vessel having an overflow and through which liquid to be measured flows, interconnected devices adapted to convert fluid pressure into motion and respectively in communication at vertically spaced fixed points arranged below the overflow, the interconnected movable elements of said devices being balanced against the difference in pressure at said points when the specific gravity of the liquid has a certain value and to be unbalanced and to move upon departure from that value and a single rod connected to each of said elements and serving to interconnect them, and an indicator operatively connected with said interconnected movable elements.

4. A specific gravity measuring device comprising, in combination, a housing, an open top conduit having an overflow and inlet and outlet connections, dip seals arranged in the housing and having reversely disposed bells, a connection from the space outside of one bell and inside its seal to the conduit at a point below the overflow connection, a connection from the space inside of the other bell and inside of its seal to the conduit at a point vertically below the point of entrance of the first mentioned connection, a rod secured to said bells and connecting said bells and movably mounted in the housing, an arm pivotally mounted in the housing and connected at one end with the rod and having gear teeth at its other end, a weighted radially disposed rod connected with the axis of said arm, a shaft mounted in the housing and having a pinion meshing with said teeth, and an indicator connected with said shaft.

HOWARD H. DECKER.